March 29, 1949. N. T. VOLSK 2,465,770
AUXILIARY COMPARTMENT FOR VEHICLES
Filed April 17, 1944 7 Sheets-Sheet 1

INVENTOR.
NICHOLAS T. VOLSK.
BY Ralph B. Stewart
ATTORNEY.

March 29, 1949.    N. T. VOLSK    2,465,770
AUXILIARY COMPARTMENT FOR VEHICLES
Filed April 17, 1944    7 Sheets-Sheet 2

INVENTOR.
NICHOLAS T. VOLSK.
BY Ralph B. Stewart
ATTORNEY.

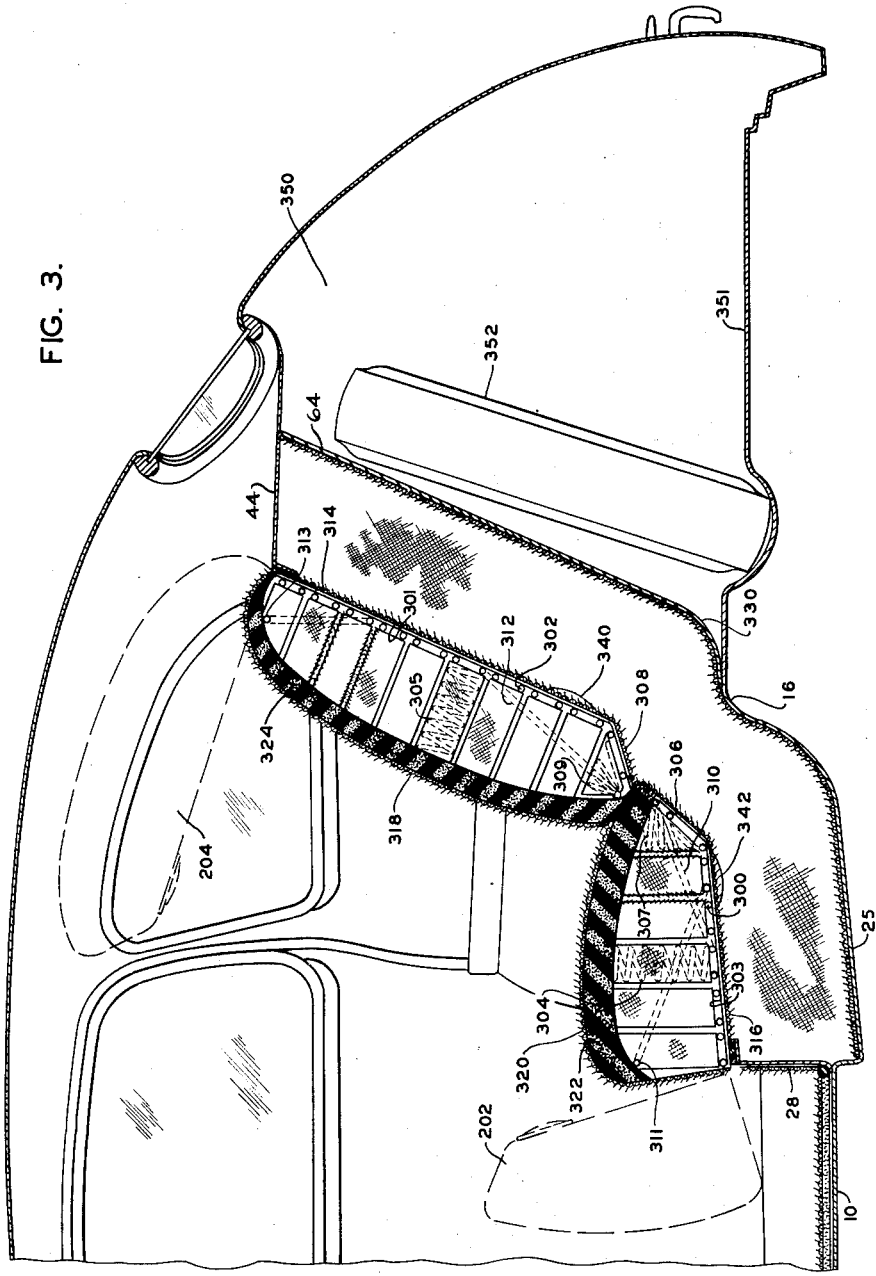

March 29, 1949.   N. T. VOLSK   2,465,770
AUXILIARY COMPARTMENT FOR VEHICLES
Filed April 17, 1944   7 Sheets-Sheet 4

INVENTOR.
NICHOLAS T. VOLSK.
BY
Ralph B. Stewart
ATTORNEY.

March 29, 1949.  N. T. VOLSK  2,465,770
AUXILIARY COMPARTMENT FOR VEHICLES
Filed April 17, 1944  7 Sheets-Sheet 5

INVENTOR.
NICHOLAS T. VOLSK.
BY
*Ralph B. Stewart*
ATTORNEY.

March 29, 1949.    N. T. VOLSK    2,465,770
AUXILIARY COMPARTMENT FOR VEHICLES
Filed April 17, 1944    7 Sheets-Sheet 6

INVENTOR.
NICHOLAS T. VOLSK.
BY
Ralph B. Stewart
ATTORNEY.

March 29, 1949.　　　　　N. T. VOLSK　　　　　2,465,770
AUXILIARY COMPARTMENT FOR VEHICLES
Filed April 17, 1944　　　　　　　　　　　7 Sheets-Sheet 7

INVENTOR.
NICHOLAS T. VOLSK.
BY
Ralph B. Stewart
ATTORNEY.

Patented Mar. 29, 1949

2,465,770

UNITED STATES PATENT OFFICE 2,465,770

AUXILIARY COMPARTMENT FOR VEHICLES

Nicholas T. Volsk, Spring Lake, N. J.

Application April 17, 1944, Serial No. 531,359

18 Claims. (Cl. 296—37)

This invention relates to an auxiliary compartment for passenger vehicles and more particularly to an auxiliary compartment for such vehicles as automobiles, airplanes and other types of transportation vehicles.

The invention is described in connection with a passenger automobile for exemplifying the structural features of the invention where it has most direct and immediate application and utility at the present time.

Most recent advancements in metallurgy, plastics, fuel chemistry, and other fields of science, as well as application of airplane design experience to the design of automobiles, will undoubtedly have a most profound effect on the automobiles manufactured after World War II. The designers are now more weight conscious, and new materials are offering much better solutions of the weight problems than has been possible in the past. Lighter body structures, smaller and lighter engines, and higher octane fuel will result in greater mileage per unit of fuel and much higher sustained speeds at a reduced operating cost. Since the trend of quieting the interior simultaneously results in the creation of well heat-insulated interiors, it is reasonable to expect continued improvements in more adequate control of temperatures of the passenger space. The super-highway trend will continue and will make fast, long distance travel a reality.

The cumulative effect of these trends will result in exposing the traveling passengers to entirely different climatic conditions within relatively short spaces of time that will elapse between leaving one climatic zone and entering another. Since the body comfort zone at any given humidity is in the order of only 3° or 4° F., it is apparent that any long distance travel involving rapid transitions from one climatic zone to the other will call for equally rapid changes in the attire of the travelers. Moreover, while outside temperatures may be quite low, temperature in the well insulated and heated passenger space may conform with a comfort zone for relatively light attire so that the passengers, on long trips at least, may be more comfortable when such heavy garments as overcoats are put away.

In the past the passenger carrying vehicles did not provide any wardrobe compartments because the design features of the entire vehicle, especially the chassis, the body, and the relationship of these elements with respect to each other, were such that no reasonably satisfactory solution of this problem could be found. Wide running boards restricted the width of the chassis and body, and positioning of the rear seat over the rear axle in the narrow bodies made it impossible to build any compartment under the rear seat structure. The attempts knowns to the art, therefore sought the solution of this problem by providing wardrobe compartments of very limited dimensions and, as a consequence, of very limited utility, by placing such compartments directly under the roof of the vehicle, or by providing a trunk directly behind the rear body panel of the vehicle. Examples of the roof compartment structures are exemplified by a number of United States patents typical of which are patents to V. P. Haas, 1,927,735, Sept. 19, 1933 and 2,236,428, March 25, 1941, and a patent to C. J. Carlisle, 1,927,735, Sept. 19, 1933. The compartment structures of the roof type were not accepted by the industry for several reasons, the most important of which were that the compartments had unsatisfactory dimensions and thus lacked utility, were not conveniently accessible and, therefore, were difficult to use, and were in direct conflict with the general body styling and proper distribution of weights. A United States patent to V. B. Rogers, 1,473,161, November 6, 1923, is the patent in which a trunk with a hinged top and as wide as the width of the rear body panel and matching the curvature of the rear panel is provided to serve as the wardrobe compartment. With the exception of weight distribution, the reasons for not accepting this type of structure by the industry were the same: unsatisfactory dimensions, lack of accessibility, lack of utility, and conflict with the general body styling.

Because of lack of satisfactory solution of the above problem, the traveling public was not provided with any facilities for storing away such garments as overcoats, with the result that when such garments were not in use they had to be held on the knees of the passengers, folded and put on the floor, sat upon, or hung along the side panels of the car, obliterating the windows in the latter case, and marring the neat appearance of vehicles. Such practices are obviously in direct conflict with the general overall desired characteristics of a vehicle such as comfort, appearance, and companionability contributing to the mental ease of the driver, economy (crushed and soiled articles), form-fitting cushions, etc. Moreover, there is a tendency on the part of the passengers to postpone or abandon altogether adjustment of their attire to prevailing temperatures because the vehicles of today do not provide any facilities for making such adjustments convenient "on the run" which often results in premature fatigue, and other detrimental physiological and neurotic reactions lowering the safety factor of a vehicle-driver combination.

It is, therefore, an object of the present invention to provide a passenger carrying vehicle with an auxiliary garment compartment having reasonably liberal dimensions, such as width, length and depth, for accommodating such full-length garments as overcoats and dresses in their natural unfolded position.

A further object of the invention is the provision of an auxiliary garment compartment for a passenger vehicle which is conveniently accessible so that the occupants may use it without any undue difficulties while the vehicle is at a standstill or even when it is in motion.

Another object of the invention is the provision of an auxiliary garment compartment for a passenger vehicle which does not interfere in any manner with the general body styling by being positioned under the seat structures and by utilizing the space made available under the seat cushions and behind the back rests of the seat without impairing the form fitting qualities of the seat cushions and backs, and softness of the seat springs.

Yet another object of the invention is the provision of a passenger vehicle with two auxiliary garment compartments which are obtained by supporting the seat cushions and backs on a frame engaging only the marginal, edge portions of the cushions and backs, depressing the vehicle floor or underpan under the seat cushion, providing a fixed, or an adjustable, space under the seat cushion and behind the seat back, and making the compartment easily accessible by dividing the seat into two equal halves, and hinging either the subdivided seat cushions and backs or the frame supporting said halves.

An additional object of this invention is the provision of a passenger vehicle with an auxiliary compartment the presence of which cannot be detected when closed, which is provided with lighting and locking facilities, which is dustproof, reasonably moisture- or humidity-proof, and the construction of which imposes insignificant expense on the manufacturer of the vehicles, since, at least one species of the invention, it involves, in the main, new disposition of elements in the existing structures rather than the addition of any new expensive elements.

The novel features which I believe to be characteristic of my invention are set forth with particularity in the appended claims. My invention itself, however, both as to its organization and method of operation, together with the further objects and advantages thereof, may best be understood by reference to the following description in connection with the accompanying drawings in which:

Fig. 3 is a vertical sectional view of the rear portion of the vehicle taken along line A—A shown in Fig. 2;

Figure 1:
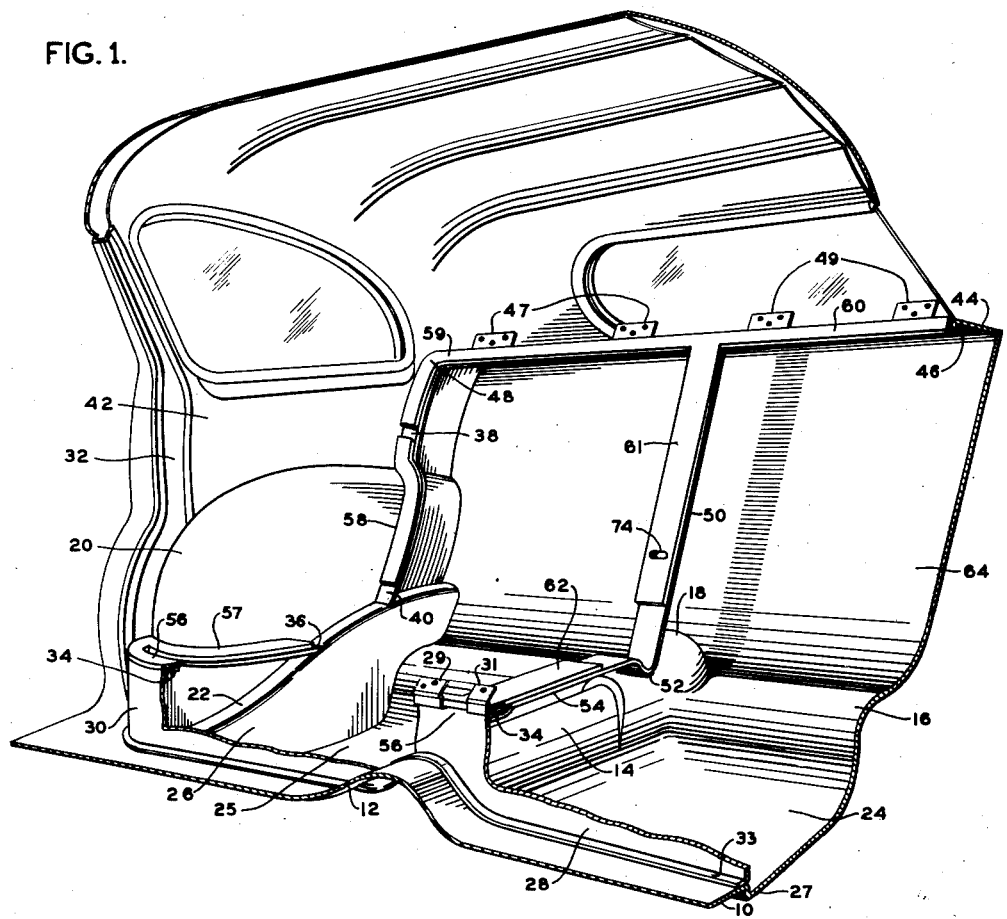
Fig. 1 is an inside perspective view of the rear part of the vehicle with the rear seat cushions and seat backs removed, and the right part of the body structure shown in section to illustrate more clearly the construction.

Referring now to Fig. 1, it illustrates the rear portion of the vehicle of sedan or tudor body type with the seats removed, and the right side panel cut away to reveal more clearly the construction of the auxiliary compartment. The invention is illustrated with this type of vehicle body because 81% of the automobiles now in the U. S. A. have a body structure of the sedan and tudor types. The teachings of the invention are nevertheless equally applicable to other types of body construction, and it may be applied to either the front or the rear seat structure. However, more effective utilization of the available space is obtained in the vehicles of today if it is applied to the rear seat structure. For this reason it is illustrated in the majority of the figures specifically in connection with the rear seat structure.

Figure 8:
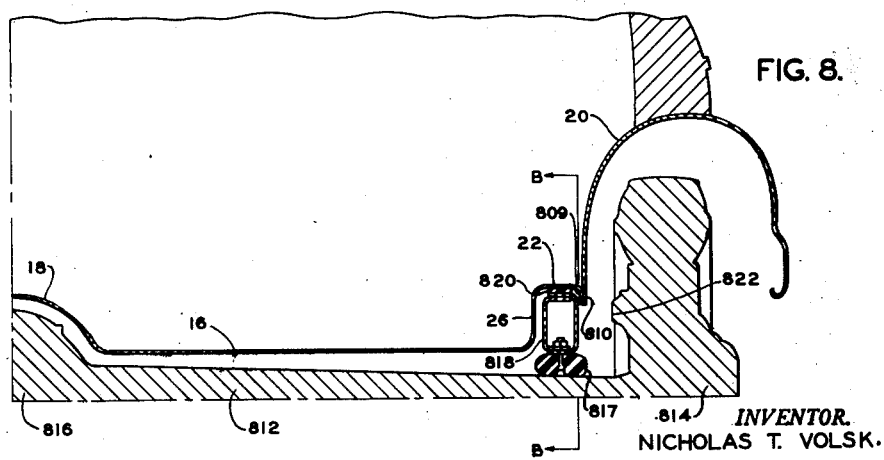
Fig. 8 is a transverse vertical cross-sectional view of the rear axle kick-up taken through the center of the rear axle.

Only a small portion of the vehicle floor 10, which is directly in front of the rear seat, is illustrated. It is provided with a conventional central kick-up 12 for accommodating the driving shaft (not shown), this kick-up extending rearwardly to its continuation at 14 under the seat, and terminating in a differential kick-up 18, and a rear axle kick-up 16; the latter two provide the necessary operating clearance for a differential gear housing 816, Fig. 8, and the rear wheel axle 812, Fig. 8 being the vertical cross-section of the axle kick-up 16 taken along the center line of the rear axle. The lower inner edge 810 of the rear wheel housing 20 is joined by welding, or any other conventional manner, to a downwardly bent portion 809 of the underpan, as illustrated in Fig. 8. The body of the vehicle is mounted in the usual manner on a chassis or frame 818, and the axle kick-up 16 is given such shape that only sufficient operating clearance exists between the axle 812 and the kick-up 16 when the axle is in its extreme upper position. This is the position of the axle illustrated in Fig. 8, the housing of the axle, when in this position, engaging and compressing a bumper element 817 mounted on the chassis frame 818. The chassis frame has its usual rear kick-up portion providing operating clearance for the rear axle, and the underpan portion 22, Figs. 1 and 8, is mounted on the rear kick-up of the chassis frame with appropriate intermittent rubber spacers 820 provided between the underpan and the frame.

Those portions of the underpan which are located between the central kick-up 14 and the side kick-ups 22, only one of the latter appearing in Fig. 1, are depressed to form two forward bottom portions 24 and 25 of two auxiliary compartments; the bottom portions 25 and 24 are joined to the side kick-ups 22 by means of their respective side walls 26, this side wall being positioned in close proximity to the frame member 818, so that the clearance between the side wall 26 and the frame 818 is only sufficient for direct mounting of the body on the frame without imposing unduly stringent manufacturing tolerances. The forward bottom portion of the compartment 24 is illustrated in all figures as being depressed somewhat below the level of the floor 10. The position of this depressed portion 24 may be either above, on the same level, or below the level of the floor 10, depending upon the space desired in the forward portion of the compartment, and the desired depth of the seat cushions. The larger percentage of the chassis frames now in use are of such construction that the bottom portions 24 and 25 of the compartments may be depressed considerably below the level of floor 10 without creating any interference with any structural members of the chassis or the wheel suspension members.

Figure 15:
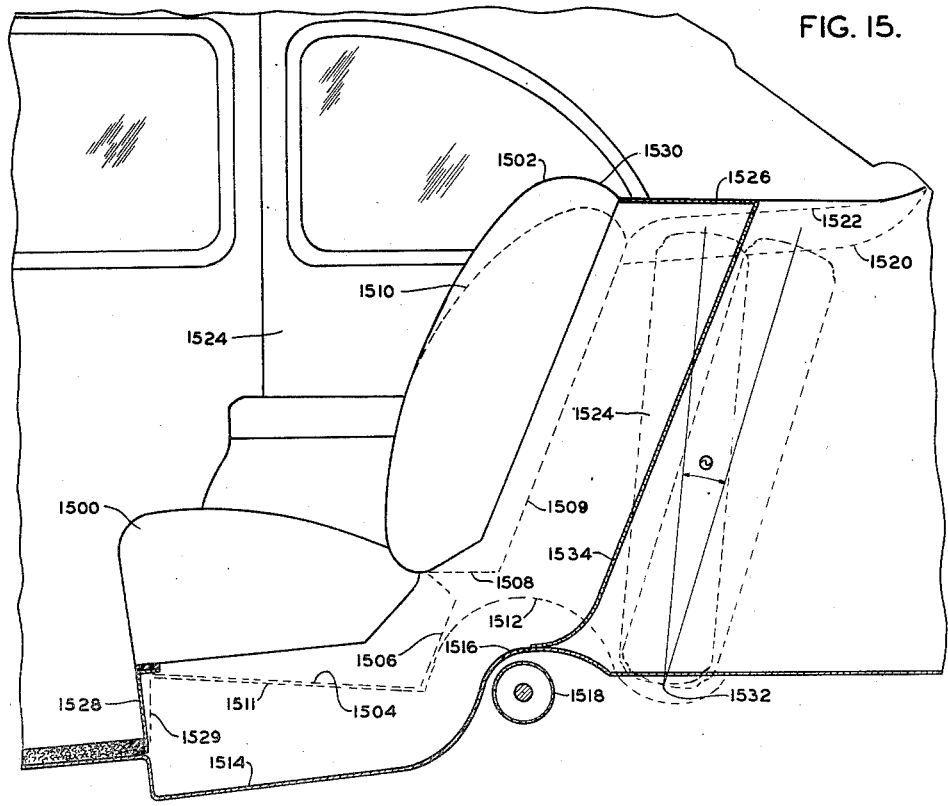
Figs. 15, 16 and 17 illustrate an application of the invention to a sedan model of well known make.

In the vehicles now in use the underpan portions 24 and 25 are bent upward so as to form a shelf elevated above the level of the floor 10, this shelf being used for supporting the seat cushions, as illustrated by a dotted line 1511 in Fig. 15. In the invention this shelf has been eliminated and this part of the underpan has been depressed downward so as to form the forward bottom portions 24 and 25 of the auxiliary compartments. The floor 10, the bottoms 24 and 25, side walls 26, kick-up portions 22, the central kick-up 14, and the rear axle kick-up 16, may be formed of one piece of metal stamped out of one sheet, or preferably of a plurality of pieces welded together along the mating flanges provided for this purpose.

Directly in front of the bottom portions 24 and 25 of the compartments, a transverse reinforcing and seat supporting member or wall 28 is provided, for closing off the space between the seat cushion and the floor. The seat support 28 is rounded at its ends, as indicated at 30, and welded to the rear door posts 32 and the wheel housing 20. The seat supporting member 28 is provided with a floor flange 33 welded to floor 10, and at its upper edge with a flange 34 directed to the rear of the vehicle which provides a flat border edge used for supporting the front end of the seat cushions and for hinging them to the transverse member 28 by means of hinges 29 and 31.

Surrounding the front portion of the rear wheel housing 20, is a flange member 36 having an L type cross-section, one end of which terminates at the junction point between the curved portion 30 of the transverse member 28, and especially its upper flange 34, and the door post 32, and the other end at the kick-up 22 of the underpan. The flange member 36 is welded to the wheel housing 20, kick-up 22, door post 32, and the transverse member 28 thus forming an extension of the flange 34 of the transverse member 28 around the wheel housing 20 where it performs the same function as the flange 34, namely, to support the bottom edge of the seat cushion. The flange member 36 may slant downwardly or rise upwardly, or be in a horizontal position, as it progresses from its junction point at the door post 32 to its second junction point with the kick-up 22, depending upon the position of the plane of the bottom portion of the seat cushions which it supports. The back cushion rests on the projecting flange of a side member 38, also of L cross section, which is welded at its bottom portion 40 to the kick-up 22 of the underpan, on its side—to the wheel housing 20 and a side panel 42, and with its top—to a shelf 44. The shelf 44 extends transversely and to the rear of the rear seat forming a conventional package shelf or tray in the rear portion of the passenger compartment, this shelf closing off the space between the back rests 204, 206, Fig. 2, and the transverse panel 64 from the passenger compartment. Shelf 44 is connected with its side edges to the side panels 42 of the passenger compartment, and with its rear edge—to the rear panel of the rear compartment 350 in conventional manner, as illustrated more clearly in Fig. 3, thus closing off the rear compartment from the passenger compartment. This shelf has an inclined flange 46 which is used for supporting the upper edge of the back cushion so that the side member 38 may be terminated at a corner 48. However, if it is desired to reinforce flange 46 of the package shelf 44, the member 38 may be extended transversely across the entire width of the vehicle, and the two flanges 38 and 46 joined by welding. Hinges 47 and 49, mounted on the flange 46, are used for hinging the upper edges of the seat backs to the flange 46.

An additional back supporting member 50 is positioned midway between the side flange members 38. The member 50 extends from the flange 46 to the differential kick-up 18 of the underpan, to which it is welded at 52. The slant of this member is the same as the slant of the side members 38, this angle of slant being determined by the angle of recline imparted to the back rest of the seat. After forming the welded junction point 52 with the differential kick-up 18, the member 50 is given first an upward and then a downward bend, and it is then joined by means of an arm 54 to the flange 34 of the transverse member 28. The upper surface of the flange 34 and the seat engaging portions of the seat supporting members 36, 38, 46, 50, and 54, are preferably lined with rubber spacers 56, 57, 58, 59, 60, 61, and 62, which are attached to the flanges of these members in any manner well known in the art. The left side of the seat cushion is, therefore, supported by the flange 34 in front, and the members 36 and 54 on its two sides, while the left side of the back rest is supported on its two sides by the members 38, 50, and on the top by the member 46. The right portion of the seat is supported in the same manner, resting on the flange 46, central member 50, the arm 54, etc.

The rear wall or back of the auxiliary compartment is formed by a slanting panel 64 which is curved at the bottom portion 330 so as to form a flowing joint with the axle kick-up 16, as is shown more clearly in Fig. 3, its angle of slant being preferably equal to the angle of slant of the back rest. The rear wall member 64 may be constructed of light sheet metal and form a welded seam joint with the axle kick-up 16, the wheel housing 20, the side panel 42, and the shelf 44. It also may be made of a cardboard material of sufficient strength so at to act as the rear panel of the auxiliary compartment. If the rear panel 64 is made of cardboard, it is preferable to have this member impregnated with any known waterproofing material, such as paraffin, so as to make this member moisture-proof. When the transverse panel 64 is made of sheet metal, it may form a well-known box-type rear end bracing with its opening closed with any water-proof material. The joints between the panel member 64 and those members of the vehicle body which support it should preferably be moisture-proof joints so that humid air could not enter the auxiliary compartment.

From the description given thus far it follows that there are two auxiliary compartments under the rear seat structure, one compartment to the left and the other compartment to the right of the center line of the vehicle, the underpan portions 24 and 25 forming the floor panels of the compartments, and the panel member 64 forming the slanting rear wall of the two compartments. That portion of the underpan which extends rearwardly and beyond the rear axle kick-up 16 is illustrated more clearly at 351 in Fig. 3. It forms a floor for a luggage compartment 350, and is of conventional type.

Figure 2:
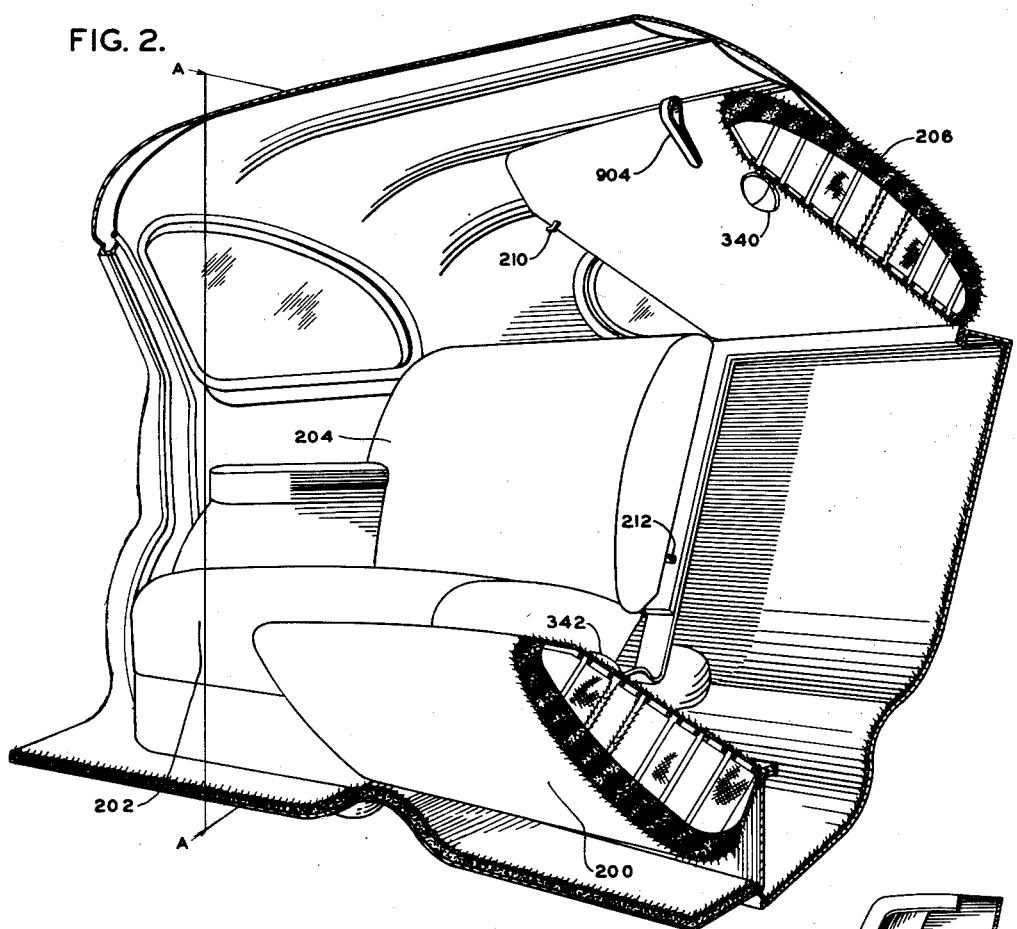
Fig. 2 is an inside perspective view of the rear corner of the vehicle illustrated in Fig. 1 with the seat cushions and seat backs in their proper place on the left side of the drawing, and in an open position on the right side of the same drawing.

The seat structure itself forms preferably four lids of the compartments, as is clearly illustrated in Fig. 2, it being divided in the middle so that there are two seat cushions 200 and 202, and two back rests 204 and 206. As mentioned before, the seat cushions are hingedly mounted on the transverse flange 34 of the transverse member 28 so that they may assume a closed position as illustrated by the seat cushion 202, and an open position as illustrated by the seat cushion 200. The same is true of the back rests 204 and 206, the back rest 204 being shown in its normal closed position, and the back rest 206 being shown in its open position.

The auxiliary compartment which is formed under the seat cushion and behind the back rest is best illustrated in its cross sectional view in Fig. 3, the seat cushion 202 being shown in solid lines in its normal position, and in a dotted line in that position which it assumes when it becomes desirable to use the auxiliary compartment. The same is true of the back rest.

The construction of the seat cushion and of the back rest is best illustrated in Fig. 3. A well known coil spring type of structure is illustrated, the modifications necessary for adapting this type of structure for the purpose at hand being described below. The first modification resides in the fact that cross members 300 and 302, which are used for supporting the coil springs 304 and 305, must now have sufficient strength and rigidity to support the seat cushion and the back rest, the cross-members now acting as bridge beams resting on the side flanges previously described in connection with Fig. 1. These flanges engage only the front and the two sides of the seat cushions, thus forming a U-shaped support for the seat cushion, and a similar inverted U-shaped support for the back rest.

Another modification of the coil spring structure resides in the slanting edges which are described below. To impart a substantially uniform depth to the auxiliary compartment throughout its length, the rear portion of the seat cushion is equipped with a slanting edge 306 so that the depth of the auxiliary compartment between the transverse kick-up portion 16 and the rear portion of the seat cushion is substantially the same as the depth of the auxiliary compartment in its other portions. The same type of slanting edge 308 construction, and for the same purpose, is used in constructing the back rest. The slanting edges are obtained by bending longitudinal rods 301, 303, and by providing shortened coil springs 307 and 309. A firm resilient locking engagement is obtained between the seat cushion and the back rest by equipping the seat cushion with conventional stabilizing rods 310 and the back rest with stabilizing rods 312 which engage respectively two border frames 311 and 313.

The bottom portions of the seat and back cushions are closed by means of any type of an appropriate finishing material 314 and 316 which may be either cardboard or fabric. When the fabric material is used, it may form a seam with a fabric material 318 and 320 used for finishing the outer surface of the seat structure. Foam rubber mats 322 and 324 are interposed between the coil springs, such as springs 304, 305, and the outer finish fabric 318 and 320, the foam rubber improving the resiliency and the form fitting properties of the seat structure and compensating for a minor loss in the resiliency of the seat structure which may take place if the height of the coil springs is reduced for gaining more space for the auxiliary compartment. Any appropriate degree of slant may be imparted to the bottom portion of the seat cushion 202, the degree of slant being determined by the degree of slant imparted to the bottom portions 24 and 25 of the compartments so that the two surfaces lie in two substantially parallel planes as illustrated in Fig. 3. Only a moderate degree of upward slant toward the rear of the compartment is illustrated in Fig. 3 since any increase in the degree of the slant would result in the diminution of the height of the coil springs located in the rear portion of the seat cushion producing undesirable reduction of elasticity in the rear portion of the seat cushion.

As illustrated in Fig. 2, the entire structure has been sub-divided into two separate compartments along the vertical plane passing through the longitudinal center line of the vehicle. This subdivision is desirable so that the users of the auxiliary compartments may reach them conveniently by using the closed seat structure for supporting themselves while they use the adjacent open compartment. No constructional details are disclosed for indicating the type of spring structure used along those midway edges of the seats and backs, where the left and right halves contact each other, since the methods and the structures that are used for sub-dividing the back rests when they are provided with the mid-seat arm rest, which are well known in the art, are fully applicable to the structure at hand. As in the case of the mid-seat arm rest, the disclosed seat structure has a continuous supporting surface of uniform elasticity so that the occupants of the seats are not aware of the existence of the separation in the supporting members.

The invention has been disclosed in connection with a conventional vehicle which has its engine mounted in front and the engine shaft connected to the rear axle by means of a drive shaft with or without a torque tube. Hence the necessity for the central kick-ups 12 and 14 illustrated in Fig. 1. In the case of vehicles with the engines mounted in the rear the necessity for the central kick-ups 12 and 14 disappears, and, depending upon the position of the rear seat with respect to the rear axle of the vehicle, the axle kick-up 16 may or may not be present at the bottom portion of the compartment. Obviously enough it is more advantageous for the disclosed structure to have the central kick-up and the axle kick-up completely eliminated, which is the case with the engine mounted in the rear compartment 350, Fig. 3, since it results in more uniform supporting surfaces and larger width or transverse dimensions of the compartment. However, even with the conventional passenger vehicles which are now in use, and which necessitate a less advantageous relationship of the elements because of the presence of the above mentioned kick-ups, and the proximity of the rear axle to the rear seat, sufficient compartment width may be obtained by positioning the frame members 818, Fig. 8, as close to the rear wheels 814, and especially to the brake drums 822, as is permissible by the lateral play of the rear axle. In some of the vehicles of today the clearance between the brake drum 822 and the frame member 818 at the rear kick-up portion of the frame is larger than is required by the lateral play of the rear axle since this clearance was of no paramount importance in the known vehicles. However, when the invention is applied to the vehicles which use an underframe for supporting the main body structure, the transverse dimension of the auxiliary compartment in its lower part is determined by the dimention between the side wall 26, Fig. 1, and the central kick-up 14. Since it is desirable to have this dimension as large as it is possible to obtain with a given wheel base, and since this dimension is determined primarily by the position of the frame member 818, Fig. 8, or the width of the frame at this part of the vehicle, it is obvious that it becomes desirable to have the vehicle frame as wide as it is possible to obtain with the given width of the wheel base and given rear axle lateral play. Accordingly, in order to obtain an auxiliary compartment having a maximum width with a given width of the wheel base, the frame member 818 must be positioned as close to the inner side of the rear wheel as it is permitted by the lateral play of the wheel. This is the position of the frame member 818 in Fig. 8; considerable clearance between the frame 818 and the brake drum 822 is indicated in this figure because the rear axle 812 is indicated in its neutral central position; when the axle swings to the left because of the lateral play, this clearance is reduced to that minimum which only prevents actual contact and friction between the wheel, the frame, and the wheel housing. In some instances, when the rear wheel spring suspension has an exceptionally long period, it becomes necessary to raise the frame kick-up to such an extent that the above-mentioned clearance must be referred to the inner tire wall which faces the frame rather than the brake drum. The governing considerations in either case are the same.

Figure 9:
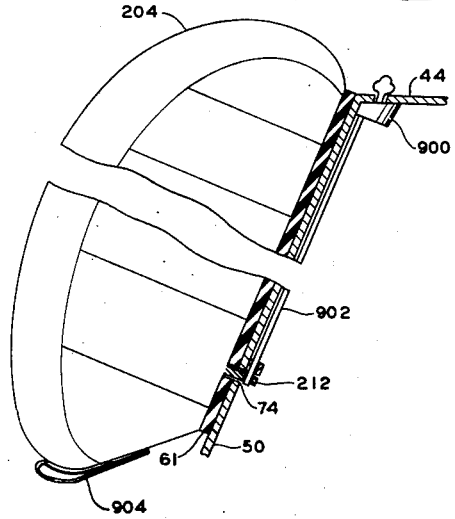
Fig. 9 is a longitudinal, vertical cross-sectional view, taken along the longitudinal center line of the vehicle illustrated in Fig. 2, showing a back rest support and the back rest in a sectionalized form.

The auxiliary compartment is provided with a lock 900, Fig. 9 mounted in a recess for this purpose in the parcel shelf 44. The locking rod 902 extends to an opening 74, Figs. 1 and 9, in the back supporting member 50. Lugs 210 and 212 are fastened to the back rests and the hooked ends of the lugs extend through opening 74 in member 50 and are engaged by rod 902 to hold the two compartments locked with a single lock rod. A loop 904, Figs. 9 and 2, is provided for opening the back rest 204.

The seat cushions and back rests may be provided with lights 340 and 342, Figs. 3 and 2, which automatically light when the structure is opened. Switching arrangements for automatic lighting of the lights 340 and 342 are not shown in any of the drawings since such arrangements are well known in the art.

The back rests 204 and 206 are provided with holding arms which hold them in open position when the compartments are in use. The holding arms are not illustrated in any of the figures since they are well known in the art. The arms used for holding hoods or luggage compartment doors in open position are equally suitable for the purpose at hand.

Figure 4:
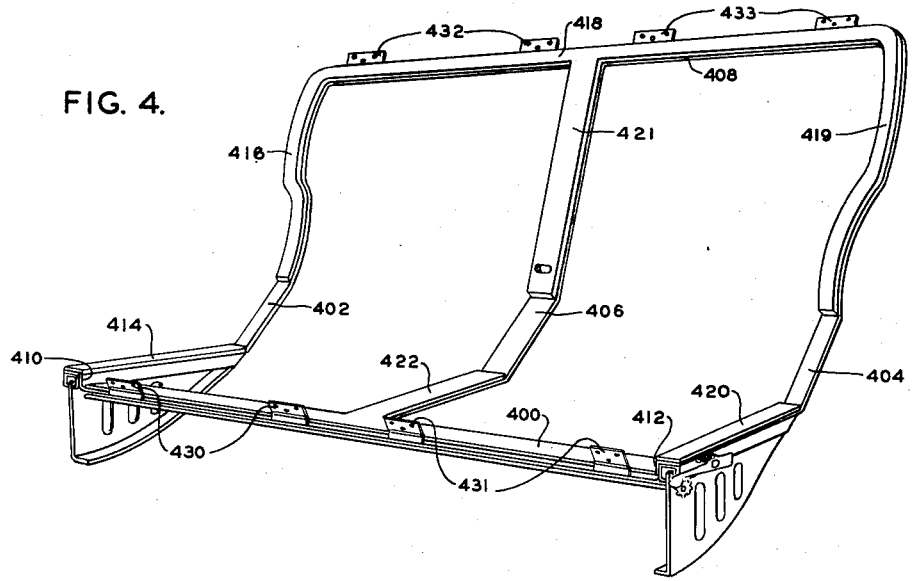
Fig. 4 is a perspective view of an adjustable frame used for mounting the seat cushions and backs in another embodiment of this invention.
Figure 5:
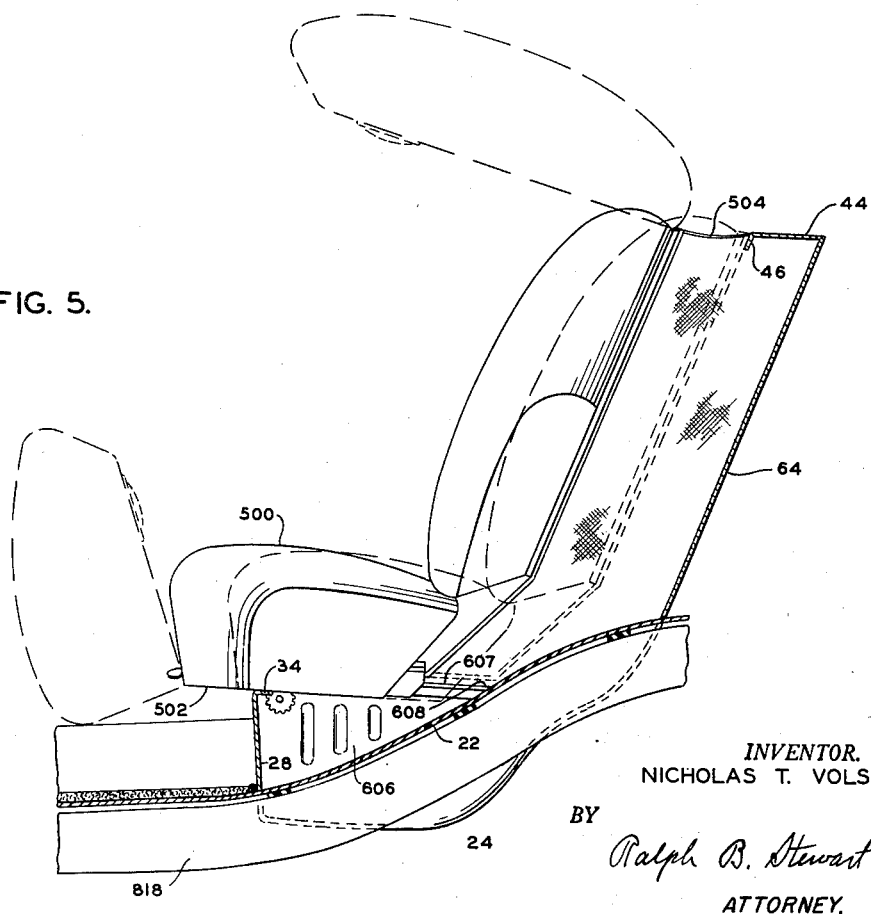
Fig. 5 is a vertical sectional view of a seat structure and compartment taken along line B—B shown in Fig. 8 with the seat cushions and backs mounted on an adjustable frame illustrated in Fig. 4.

Figs. 4 and 5 illustrate a modified form of the auxiliary compartment. In Figs. 2 and 3 the seat cushions and backs are attached by means of hinges 29, 31, 47 and 49 to the fixed flange members 34 and 46 so that their position with respect to the body of the vehicle remains permanently fixed except for their rotation on the hinges. In Figs. 4 and 5 the seats are hinged to a frame mounted on an adjustable seat track illustrated in Fig. 6, the adjustable track allowing the entire assembly to slide forward along the longitudinal axis of the vehicle.

Because of the vehicles' general design factors, such as length of engine, length of wheel base, types of rear and front wheel suspensions, distribution of weight requirements, etc., some vehicles have only very limited space available for passenger compartment and for the rear luggage compartment. When this is the case, the arrangement illustrated in Figs. 4 and 5 offers certain advantages although it involves the introduction of new elements such as the adjustable seat track and the seat supporting frame making this type of structure more expensive and heavier than the one disclosed in Figs. 2 and 3.

The advantage of the adjustable seat arrangement resides in the fact that the depth of the auxiliary compartment may be adjusted for accommodating its holding capacity to the existing need, and when the compartment is not in use, its vertical portion, which is the portion directly in the rear of the back rest, may be either partly or completely eliminated by sliding the seat to its extreme rearward position, thus providing more room between the front and rear seats. The structure of this type, therefore, does not impose a fixed space burden upon the passenger and luggage compartments. It should be noted here that the structure disclosed in the Figs. 1 through 3 does not impose any fixed space burden on the passenger compartment, but it imposes some minor fixed burden on the luggage compartment 350, Fig. 3, since the rear portion of the compartment has been created in the above figures in part by increasing the angle of slant of a spare tire and wheel 352. The amount of borrowed space from the luggage compartment in the Figs. 1 through 3 will be discussed later in this specification.

Figure 7:
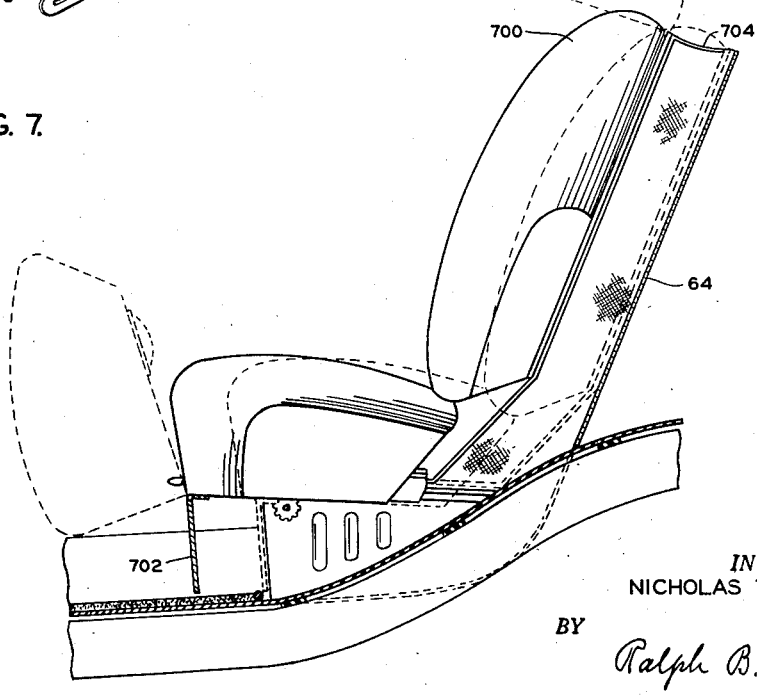
Fig. 7 is a modified form of an auxiliary compartment disclosed in Fig. 5.

Two types of arrangements are possible in connection with the adjustable seat arrangement. A relatively shallow compartment may be provided in the rear of the back rest where the seat is in its extreme rearward position so that some storage space is available all the time. Preferably this minimum available depth is obtained by borrowing the necessary space from the rear luggage compartment. This type of arrangement is illustrated in Fig. 5. In the second arrangement the vertical portion of the compartment is completely eliminated when the seat is in its extreme rearward position, and storage space may be obtained only by sliding the seat forward. This arrangement is illustrated in Fig. 7. The only merit of the latter arrangement is that it allows complete elimination of the vertical portion of the compartment when it is not in use, thus avoiding the disadvantage of introducing fixed space burden on the luggage compartment. Its disadvantage is that all increase in depth of the compartment must be obtained by sliding the seat forward, and this decreases the distance between the front and rear seats. The first arrangement, a shallow vertical portion which can be made deeper by sliding the seat forward, may be considered as a compromise between the arrangement illustrated in Fig. 7 and the compartment arrangement disclosed in Figs. 1 through 3. The choice between the three possible alternative forms perhaps does not depend so much on the relative merits and demerits of the individual arrangements as on the cost of production, the vehicles general design factors mentioned previously, the type of rear wheel suspension, position of coil springs, when such are used, frame cross-braces, etc.

Figure 6:
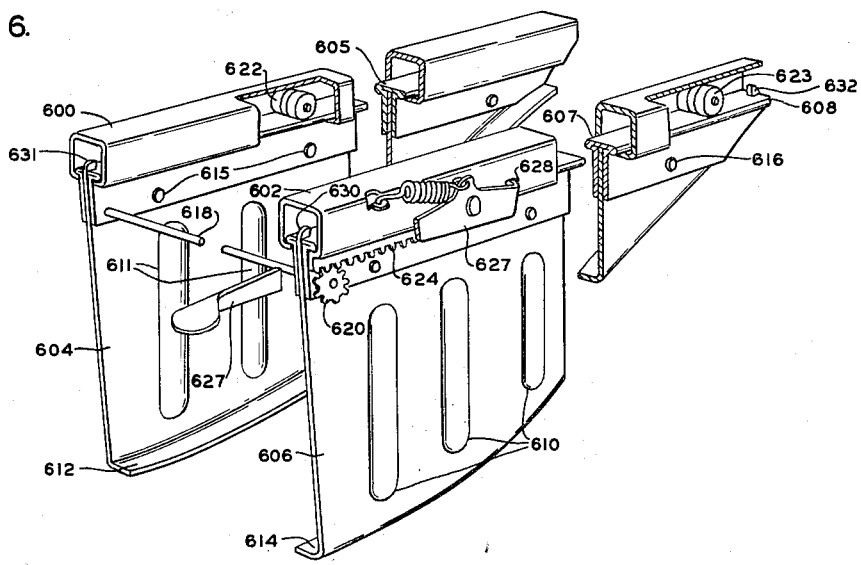
Fig. 6 is a perspective view of an adjustable track used for mounting the adjustable seat frame illustrated in Fig. 4.

Proceeding now with a more specific description of the Figs. 4, 5 and 6, the seat supporting frame, illustrated in a perspective view in Fig. 4, consists of a front cross member 400, two side members 402, 404, a center member 406, and a rear cross-member 408. The shape imparted to these members is such that they match the corresponding adjacent parts of the body; thus the rear cross-member 408 normally matches the flange 46, Figs. 1 and 5, of the parcel tray, the shape of the upper portion of the side members 402, 404 corresponds to the shape of the side members 38, Fig. 1, their lower portions terminating in two L-shaped members 410 and 412 which rest upon and are bolted or welded to the flat tops of runners 600 and 602, Fig. 6. The front portions of the L members 410 and 412 are either connected to or form an integral part of the front cross-member 400, the latter normally matching the horizontal flange 34, Fig. 1, of the transverse member 28. The frame for simplicity is illustrated as being made of flat strips of metal having rectangular cross-sections; better results will be obtained from the point of view of rigidity and stress-strain relationship per unit weight of metal used if the frame is made of hollow, tubular members bent to follow the desired contours of the vehicle. Equally good results may be obtained by using stamped corrugated sheet metal strips. As in the case of Figs. 1 through 3, rubber strips 414, 416, 418, 419, 420, 421 and 422 are used between the frame and the seat to provide noiseless, dust and moisture-proof fit between them. For more efficient utilization of the vertical and horizontal dimensions available for the tracks, the runners 600 and 602, together with the L-shaped members 410 and 412 of the frame are preferably counter-sunk into the seat cushion 500, Fig. 5. Since the track brackets 604 and 606 are mounted on the rear kick-up portions 22, Fig. 5, lowering of the track brackets may make them so short that they will not provide sufficiently rigid support for the seat. That this is so may be seen from Fig. 5. The extreme rear portion 608 of the track bracket 606 abuts against the kick-up member 22, and any lowering of the brackets makes tracks 605 and 607 shorter. When the position of the rear seat with respect to the rear axle and the contour line of the rear kick-up are such that sufficient length is available for mounting the seat tracks without countersinking them in the cushion, a simpler cushion structure is the result. The disadvantage of the latter type of mounting, however, is that openings for the runners 600 and 602 must then be provided in the transverse member 28, thus marring its neat appearance.

As illustrated more clearly in Fig. 5, the track brackets 604 and 606 are given such dimensions that the seat rises as it slides forward, which is in conformance with the well known teachings of the adjustable seats art. The bottom portion 502 of the seat cushion 500 preferably lies in a plane parallel to the plane of the rails 605 and 607 of the seat track so that, as the seat slides forward, no increase in the normal separation between the bottom portion 502 and flange 34 takes place.

The construction of the seat cushion 500 does not differ otherwise from the construction of the cushion 202 illustrated in the Figs. 2 and 3. As in the prior case, the seat is preferably subdivided into two equal halves, and each half is hinged by means of hinges 430, 431, 432 and 433 to the front and rear cross-members 400 and 408 of the frame. A flexible cover 504 is provided between the cross member 408 and the parcel tray 44, which keeps the compartment closed when the cross member 408 separates from the flange 46 during forward travel of the seat structure.

Fig. 6 illustrates one type of the adjustable seat tracks which are suitable for the purpose at hand. The seat-tracks include track brackets, rails attached to the brackets, and runners slidingly mounted on the rails. The track brackets 604, 606 are corrugated on their sides at 610 and 611 to increase their lateral rigidity, and are provided at the bottom with flanges 612 and 614 which, together with the vertical portions of the track brackets, are made to fit directly over the rear kick-up portions 22, Figs. 1 and 5, of the underpan. At the top, the brackets terminate in the two rails 605 and 607 which are riveted by rivets 615 and 616 to the track brackets. Directly in front, mounted in the extreme upper left corners of the brackets 604 and 606, is a synchronizing rod 618 which is rigidly connected to two synchronizing gears, only one of which, gear 620, may be seen in the figure. Fitting over the rails 605 and 607 are two runners 600 and 602 each equipped with two rollers, two of which, rollers 622 and 623, can be seen in the figure. The front portions of the runners are equipped with racks, only rack 624 being visible in the figure. The racks, gears, and the synchronizing rod interconnect the runners 600 and 602 in a well known manner preventing their misalignment and forcing the runners to move in unison. One of the runners, runner 602, is provided with a conventional latch 627 which holds the runners in a locked position by engaging, with its tooth 628, an appropriate slot (not seen in the figure) in the rail 607. The rails 605 and 607 are equipped with conventional stops 630, 631 and 632 which limit the motion of the runners 600 and 602 by engaging the front and rear rollers respectively. The advantages of the seat-tracks illustrated in Fig. 6 are: the synchronizing rod 618 does not interfere with the space in the auxiliary compartments because it remains in a fixed, out of the way position under all conditions, and the adjustable seat-track is mounted on the rear kick-up 22 so that the entire assembly does not interfere with the useful space of the compartment.

There is now in use a type of body structure in which the inner edge 810, Fig. 8, of the rear wheel housing 20 is connected to the wall 26 of the underpan rather than the underpan flange 809. When this is the case, the track brackets 604 and 606 may be secured to the side walls 26 of the auxiliary compartments. The flanges 612 and 614 lose their usefulness in the mounting of the latter type, and, instead, the flat, vertical portions of the brackets must now be shaped so as to match the curvature of the walls 26 or the wheel housings 20 to which they are attached in this type of construction. If the flange structure is retained, then the vertical portions 604, 606 are made higher so that the flanges 612, 614 rest on the bottoms 24 and 25 of the compartments.

Fig. 7 discloses that modification of Fig. 5 in which the vertical portion of the compartment is completely eliminated when the seat is in its extreme rearward position, and storage space may be obtained only by sliding the seat forward. The modification resides in the main in the position of the rear panel 64 with respect to the back rest 700. The seat is mounted on the frame illustrated in Fig. 4, and on the adjustable seat track, Fig. 6, and when the seat is in the extreme rearward position the back rest 700 and the rear panel 64 engage each other, as illustrated in dotted lines in Fig. 7. In order to obtain the total length, i. e., from a cross member 702 to a flexible cover 704, with the compartment illustrated in Fig. 7 comparable with the total length available with the compartment illustrated in the Figs. 1 through 3, the front transverse member 702, which corresponds to the transverse member 28 in Fig. 1, is now secured to the transverse member 400 of the frame illustrated in Fig. 4 so that the member 702 now slides forward with the seat. Accordingly, in Fig. 7 sliding of the seat forward increases the depth of the compartment behind the seat back, and lengthens it in front when member 702 slides forward with the seat. The forward position of the seat is illustrated in solid lines.

Figure 10:
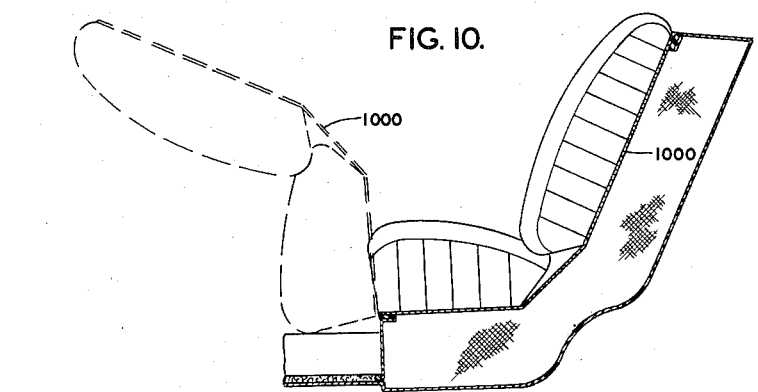
Figs. 10 and 11 are vertical sectional views of the seat structure and compartment, taken along the same line as Fig. 3, with modified hinging arrangements.
Figure 11:
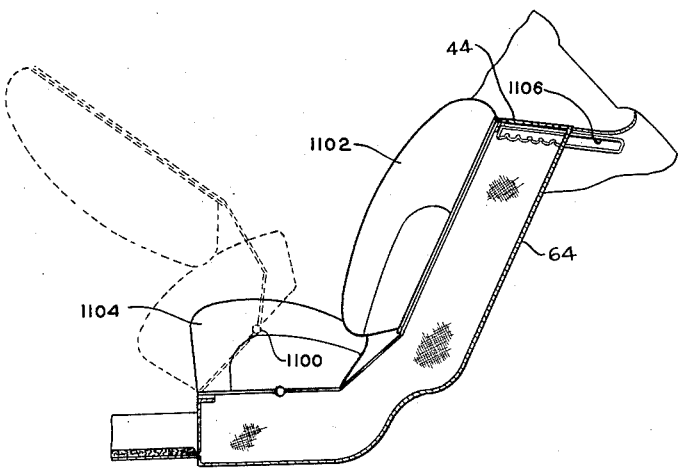

Figs. 10 and 11 illustrate two additional modes of hinging the seat cushions and back rests which may be used in connection with the structures disclosed in the Figs. 1 through 7. In Fig. 10 the seat is mounted on a frame 1000 which may be identical in form and shape to a frame disclosed in Fig. 4 with one exception: the center member 406, Fig. 4, in Fig. 10 is made of two members which are produced by bisecting the member 406 with a vertical plane coinciding with the longitudinal center line of the vehicle. Thus, there are two frames in Fig. 10 which are hinged in front and are positioned side by side, the seat cushions and back rests being permanently secured to the frames. These frame-seat combinations form two lids of the two compartments illustrated in Fig. 2. Cross-members may be used to stiffen the frame in this type of construction, if so desired. Since in Fig. 10 the entire frame is hinged and is lifted with the seat for opening the compartment, the cross-members of the frame will not interfere with the use of the compartment.

Figure 18:
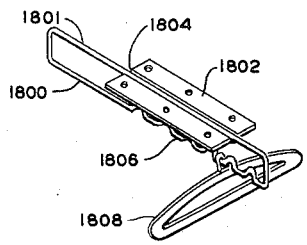
Fig. 18 illustrates a perspective view of a hanger holder which facilitates the use of the disclosed auxiliary compartments.

The seat hinging arrangement disclosed in Fig. 11 is similar to that disclosed in Fig. 10 except that an additional hinge 1100 is provided which hinges the back rest 1102 to the base of the seat cushion 1104. This hinging arrangement has a shorter total radius than the one disclosed in Fig. 10 and may be found useful when the top or roof of the vehicle is especially low. Fig. 11 also illustrates a hanger holder 1106 the construction of which will be described more fully in connection with the description of Fig. 18 illustrating this holder.

For a number of years there have been in use rear seat cushions which have an upholstered wire frame extending all way down to the floor 10 directly in front of the transverse member 1529, Fig. 15. With the seat cushions of this type hinges 29 and 31 can be attached to the bottom portions of the now subdivided wire frame and floor 10, thus converting the central portion of the transverse member 28 into a composite transverse member two portions of which are hinged extensions of the two halves of the seat cushion.

Figure 12:
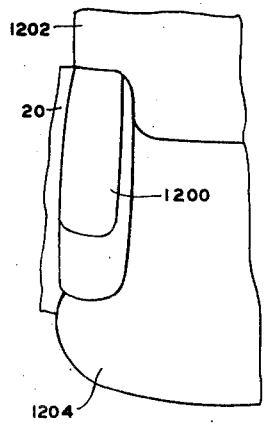
Figs. 12, 13 and 14 illustrate two methods of securing arm rests when the seat structure is mounted on an adjustable seat track.
Figure 13:
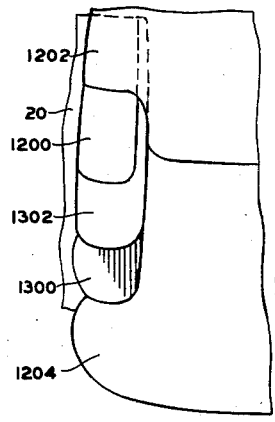
Figure 14:
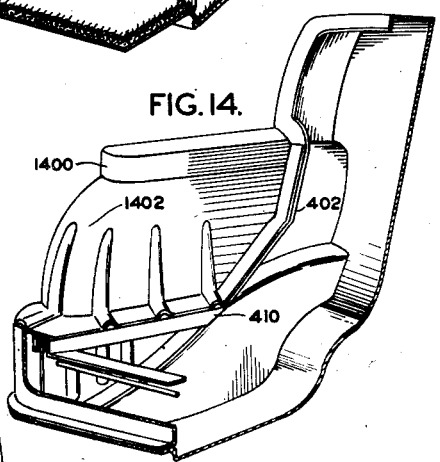

Figs. 12 through 14 disclose two methods of mounting the side arm rests, ordinarily provided for the rear seats, when the adjustable seat type of structure is used. Figs. 12 and 13 disclose a conventional arm rest 1200 (plan view) mounted on the wheel housing 20 in well known manner. When conventional mode of mounting the arm rest 1200 on the wheel housing 20 is used, the back rest 1202 must be provided with sufficient clearance throughout its depth to slide over the arm rest 1200, as illustrated in Fig. 13. In Fig. 13 the seat cushion 1204 and back rest 1202 are illustrated in their extreme forward position, the back rest 1202 partially overlapping the arm rest 1200 in this position. There are two disadvantages of mounting the arm rests on the wheel housing 20 when the adjustable seat arrangement is used: when the seat is in its extreme forward position, the back rest 1202 overlaps a considerable portion of the arm rest 1200 which makes the arm rest inconveniently short; another disadvantage is a gap 1300 which appears between the seat cushion 1204 and the lower portion 1302 of the arm rest 1200. When these disadvantages are considered to be sufficiently serious, a type of arm rest mounting illustrated in Fig. 14 may be used which avoids the inherent weaknesses of the conventional type of mounting of the arm rests. In Fig. 14 the arm rest 1400 is mounted on a bracket 1402 made of stamped sheet metal which is connected to the frame members 402 and 410, the latter two corresponding to the similarly numbered members in Fig. 4. The bracket 1402 is given a curvature which matches the surface of the wheel housing 20. When the seat is moved forward in Fig. 14, the arm rest 1400 moves with the seat. The disadvantages mentioned in connection with Fig. 13 are thus avoided with the construction disclosed in Fig. 14.

Several additional modifications of the disclosed structures are outlined below although they are not illustrated in any of the drawings.

Longitudinal member 54, Fig. 1. This member may be completely eliminated and the central kick-up 14 elevated to the level of the longitudinal member 54.

Total length of the compartment. The total length of the compartment, i. e., from the top 44 to the transverse member 28, Fig. 3, etc., may be increased by depressing the bottom panels 24 and 25 considerably below the level of the floor panel 10, and continuing the auxiliary compartment the desired additional length under the floor panel 10. The necessity for this modification is remote. Equally remote is the necessity for extending the top portion of the compartment further into the luggage compartment by bending the upper portion of the rear panel 64 of the compartment until it is parallel to the parcel shelf 44, extending this horizontal portion into the luggage compartment, and then closing the compartment in the rear with a vertical panel. It should be noted that the hanger holder in this modification must be mounted vertically.

Types of springs in the seat structures. The invention has been disclosed in connection with the conventional coil springs because of their highly desirable performance characteristics. More effective utilization of the available space may be obtained if poorer spring characteristics can be tolerated. By using flat springs and flat spring structures, for example, such as those disclosed in the United States Patents 2,158,647, H. F. Wolff, May 16, 1939; 2,293,563, E. A. Ruggles, Aug. 18, 1942; 2,241,551, H. Hopkes, May 13, 1941; and 2,261,996, A. H. Haberstump, Nov. 11, 1941, etc. (class 155, subclass 179), compartments with larger depth may be obtained.

*Mid-arm rest.*—There are now in use seat structures which are provided with a mid-arm rest. This may be obviously retained, and the supporting member 50, Fig. 1 or frame member 406, Fig. 4, modified so that the edges of the back rests on both sides of the mid-arm rest are supported in the manner disclosed in connection with Figs. 1 and 4.

Figure 16:
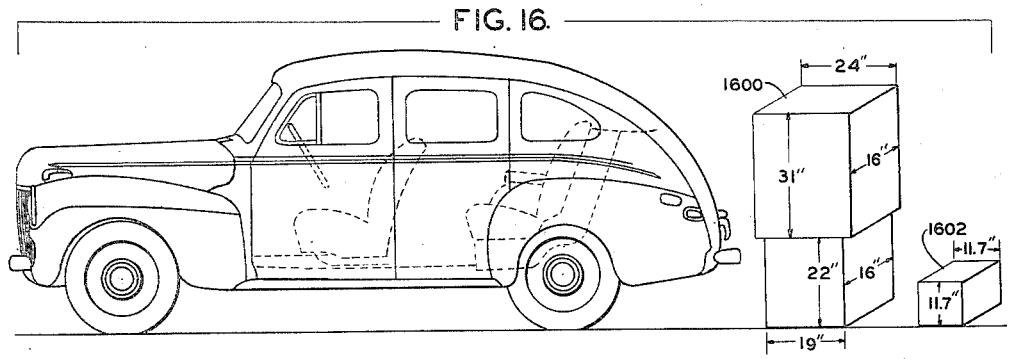
Figure 17:
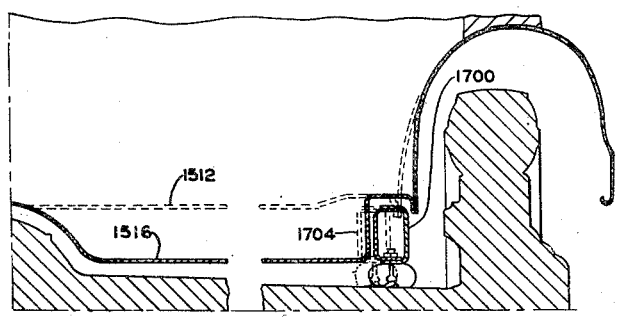

Figs. 15, 16 and 17 illustrate an actual application of this invention as disclosed in the Figs. 1, 2 and 3, to a sedan model of well known make. All three figures are drawn to scale, Figures 15 and 17 being reduced to one eighth size, and Fig. 16 being reduced to one thirty-second size. Figs. 15 and 17 illustrate the conventional type of construction in dotted lines, and the modified construction in solid lines. The side panels, floor, and the arm rest are shown in solid lines in Fig. 15, since they are not affected by the modifications. The modified shapes of the seat cushion and back rest are illustrated at 1500 and 1502 respectively, the dotted lines 1504 and 1506 defining that part of the cross-sectional view of the conventional seat cushion which has been eliminated to gain space in the auxiliary compartment. The same is true of the dotted lines 1508, 1509 and 1510 which define the conventional cross-sectional view of the back rest. Where the dotted lines merge with the solid lines, the solid lines illustrate the construction which remains the same in both cases, the new construction thus merging into the old construction. The dotted lines 1511 and 1512 illustrate the seat cushion supporting shelf and the shape of the rear axle transverse kick-up, respectively, as they appear in the above model of the automobile. The shelf 1511 has been eliminated and replaced with the compartment bottom panel 1514, while the rear axle kick-up 1512 has been depressed to a lower level illustrated by the kick-up line 1516. The extreme upward position of the rear axle housing is illustrated by its cross-sectional view at 1518. Dotted lines 1520 and 1522 illustrate the outline of the package shelf behind the rear seat in the old structure. This shelf has a central kick-up illustrated by the dotted line 1522, which is used for accommodating the spare wheel and tire 1524. In the illustrated vehicle the spare wheel is centrally mounted; therefore, the central kick-up 1522 of the shelf and the tire 1524 should not appear in the cross-sectional view illustrated in Fig. 15 since the illustrated cross-section, with the exception of the shelf's kick-up and the spare wheel, is taken approximately midway between the longitudinal center line of the car and the side-panel 1524; the illustrated cross-section, therefore, misses these elements; the spare wheel and the shelf's kick-up are nevertheless illustrated in the figure in such a manner as if the illustrated section were taken along the center line of the vehicle, with respect to these two members only, to demonstrate more clearly the proposed modifications. The level of the package shelf has been slightly raised to the level indicated by the solid line 1526 to increase the total length of the compartment, i. e., from the shelf 1526 to the transverse member 1528; the position of the latter member has been changed only slightly from its old position illustrated by a dotted line 1529. The height of the back rest has been increased by approximately one inch, as indicated by the solid line 1530. The spare wheel 1524 has been turned around its lower point 1532 by an angle $\theta$, which is equal approximately to 11.5°, and mounted on the rear panel 1534 of the auxiliary compartment. The created compartments are approximately 8″ deep, 48″ long on the top (i. e., directly under the seat), and 58.5 inches long on the bottom (i. e., along the rear panel 1534 and the bottom panel 1514), the average length being approximately 53 inches.

Fig. 17 illustrates the new position of the frame member 1700, and the shape of the transverse kick-up 1516. The position of these members in the known construction is illustrated by the dotted lines 1704 and 1512 respectively. Since these changes have been already fully described in the specification, their description need not be repeated here. It is obviously of interest to note, however, that the width of the compartments at their narrower portions (between the side wall 26 and the driving shaft kick-up 14, Fig. 1) in the Figs. 15, 16 and 17 is in the order of 19 inches.

Fig. 16 illustrates the auxiliary compartment in its true scale as it appears in the above-mentioned model of the automobile. Two compartments with an average length of 53″ have been created, and the approximate total cubic displacement of the two compartments, this cubic displacement and the automobile being drawn on the same scale, is indicated at 1600 in Fig. 16. The combined dimensions of the two compartments, as given in the figure, are as follows: 19½″ approximate width for an approximate height of 22″; 24″ approximate width for an approximate height of 31″; with total depth of 16″ (each compartment is 8″ deep). The indicated dimensions demonstrate the adequacy of the auxiliary compartments for the intended purpose. The extra width on the top (24″) is provided where it is needed most to accommodate the extra width of the upper half of the suspended garments due to sleeves.

At 1602 the approximate cubic displacement of the space borrowed from the luggage compartment is drawn on the same scale as the remaining elements in Fig. 16. Examination of Fig. 15 reveals that it is equal roughly to the total cubic displacement of the spare wheel 1524 divided by 2, or approximately 0.96 cu. ft. This is illustrated by a cube 1602, the sides of which are 11.7" long.

Fig. 18 discloses a hanger holder which facilitates the use of the auxiliary compartments. It consists of a flat loop of wire 1800—1801 supported by a plate 1802, the latter being provided with a centrally located groove 1804 for accommodating the upper wire 1801 of the wire loop. The front portion 1806 of the lower wire 1800 is bent to form a series of sinusoidal waves, this portion of the loop being used for supporting the garment hangers, such as 1808. The plate 1802 is fastened by means of set-screws or spot-welding to the inner side of the shelf member 44, Figs. 1, 3 and 11. The length of the sinusoidal portion 1806 of the wire and of the plate 1802 are equal to the depth of the compartment (8" in Fig. 15), while the total length of the loop is approximately twice the depth of the compartment, so that in its normal position the left side of the loop projects into the luggage compartment as illustrated in Fig. 11. The desirable feature of this holder resides in the fact that it can be pulled forward, thus making it more accessible; it also enables a person using the compartment to pull forward all garments and select the desired garment more easily. When the holder is used with the adjustable seat, the plate 1802 is mounted in the rear of the adjustable portion of the compartment, and the loop 1800—1801 may be made to follow the seat when the seat advances forward by means of a coil spring (not shown).

It should be noted that the above application of the invention to the sedan model, and the dimensions quoted in connection with the Figs. 15, 16 and 17, illustrate one example of an application of one modification of this invention to the above model. It should be apparent, however, that even the specific application of this modification to the above mentioned model of the vehicle does not necessarily represent the only mode of applying this invention, since, from the previously given description of the invention, it is apparent that the dimensions of the auxiliary compartment, such as its average length, depth, and width, may be varied, depending upon the type of compartment which one wishes to obtain, and other factors, such as type of seat structure, seat springs, position of the seat with respect to the rear axle, etc., which appear especially suitable for the contemplated compartment. The illustrated example was selected for the sake of completeness of the disclosure, and for demonstrating one specific example of the actual application of one species of this invention to one type of vehicle which is now in use.

It has been previously mentioned in the specification that more advantageous relationship of the disclosed elements is obtained when the engine of the vehicle is mounted in the rear compartment. Accordingly, the term, rear compartment, as used in the specification and claims, signifies a compartment located behind the rear seat which may be used as a luggage compartment, or as a compartment for mounting the vehicle's engine.

It is believed that the construction of the auxiliary compartment as well as the many advantages thereof will be apparent from the foregoing description. It will therefore be apparent that while I have shown and described my invention in several preferred forms, many changes and modifications may be made without departing from the spirit of the invention as sought to be defined in the following claims:

I claim:

1. A passenger car body comprising a passenger compartment; a rear compartment; and two normally closed auxiliary compartments for storing full-length garments in an unfolded condition; said auxiliary compartments being positioned side-by-side, and between said passenger and said rear compartment; an upright, transverse member for closing-off said auxiliary compartments from said rear compartment, said auxiliary and passenger compartments being additionally defined by a floor extending rearwardly to said transverse member; a seat having a transversely continuous seat cushion and a back rest subdivided into two halves and held in spaced relationship with respect to said floor and said transverse panel; additional panels for closing-off the continuous space under and behind said seat from said passenger compartment, thereby providing said two closed auxiliary compartments under each half of said seat cushion and back rest; and individual hinging means for each half of said cushion and back rest for providing access to the entire length of each auxiliary compartment by using the closed half of said seat as a support for the user of the compartment.

2. A passenger car body as defined in claim 1 which further includes side panels of said body; a wheel housing embodied in each of said side panels, said wheel housing projecting inwardly adjacent to said seat; a frame formed separately from said body for supporting said seat; a pair of adjustable seat-tracks, each of said seat-tracks being mounted adjacent to the respective wheel housing and supporting said frame so as to permit adjustment of said seat with respect to said transverse panel; and a pair of arm rests attached to and movable with said frame, each of said arm rests partially overlying the adjacent wheel housing when said frame is in its rear position.

3. A closed pleasure car body of conventional lines comprising a passenger compartment; a rear compartment; and two closed auxiliary compartments for storing full-length garments in an unfolded condition; said auxiliary compartments being positioned side-by-side, and between said passenger and rear compartments; common side-walls for said passenger and auxiliary compartments; an upright, transverse panel arranged between said side-walls for closing-off said auxiliary compartments from said rear compartment; said passenger and auxiliary compartments being additionally defined by a floor extending rearwardly to said panel; a seat having a seat cushion and a back rest subdivided into two halves; means for holding said seat cushion and said back rest in spaced relationship with respect to said floor and said transverse panel, respectively; said means including a fixed shelf in the rear portion of said passenger compartment and behind said back rest mounted substantially at the upper rear edge of said back rest; and a transverse member mounted on said floor beneath said seat cushion substantially at the front edge thereof for closing-off the space between said seat cushion and said floor, thereby providing said two closed, auxiliary compartments, under each half of said cushion and back rest, extending as a continuous space from said fixed shelf to said transverse member, said compartment being achieved without reducing the normal dimensions of said passenger compartment within said body and without extending the body side-walls rearwardly beyond conventional lines; and individual hinging means for each half of said cushion and back rest for providing access to the entire length of each auxiliary compartment.

4. In a vehicle body construction, an auxiliary compartment for the storage of full-length garments in an unfolded condition comprising, in combination with the floor and side-walls of a vehicle body, a transverse panel arranged between said side-walls and connected with said floor; a seat including a subdivided seat cushion and a subdivided back rest; means for supporting each subdivided portion of said seat cushion at the side edges thereof in spaced relation above said floor and in front of said transverse panel; means for supporting each subdivided portion of said back rest along the side edges thereof in spaced relation to said transverse panel; a substantially horizontal shelf arranged substantially at the upper edge of said back rest for closing-off the space between said back rest and said transverse panel; a substantially vertical member arranged beneath said seat cushion, substantially at the front edge thereof, for closing-off the space between said seat cushion and said floor, thereby providing a closed auxiliary compartment formed of a continuous, uninterrupted space extending from said horizontal shelf downwardly behind said back rest, and forwardly beneath said seat cushion to said vertical member; and individual hinging means for each subdivided portion of said seat cushion and back rest for movement out of the normal positions and into positions providing access to the entire length of the open portion of said compartment for suspending said garments under said shelf within said compartment and for their removal therefrom.

5. In a vehicle body construction, an auxiliary compartment for the storage of full-length garments in an unfolded condition comprising, in combination with the floor and side-walls of a vehicle body, a transverse panel connected to said side-walls and said floor, a seat including a seat cushion and a back rest, each forming a continuous supporting surface and each divided into two substantially equal halves; means for supporting each half-cushion and each half of said back rest in spaced relation above said floor and in front of and spaced from said transverse panel; a substantially horizontal shelf arranged substantially at the upper edge of said back rest for closing-off the space between said back rest and said transverse panel, a substantially vertical wall arranged substantially at the front of said seat cushion for closing-off the space between said floor and said seat cushion, thereby providing a closed auxiliary compartment formed of a continuous space extending from said horizontal shelf downwardly behind said back rest and forwardly beneath said seat cushion to said vertical wall, and an individual hinging arrangement for each half of said seat, thereby permitting easy access to the entire open half of said compartment by using the closed half of said seat as a support for the user of the compartment.

6. A vehicle body construction, according to claim 5, which further includes latching means for engaging each half of said back rest at a point below said shelf, and a lock supported on said shelf and serving to lock said latching means in latched position.

7. A vehicle body construction, according to claim 5, which further includes a garment hanger-holder secured to the under-face of said shelf behind each half of said back rest, each of said hanger-holders having means for sliding said garment-holder forward beyond the front edge of said shelf for facilitating hanging and removal of said garments in and from said compartment.

8. In an automobile body comprising a passenger compartment; a rear compartment; and a closed auxiliary compartment positioned between said passenger and rear compartments; common side-walls for all of said compartments; an upright, transverse panel arranged between said side-walls for closing-off said auxiliary compartment from said rear compartment; said passenger and said auxiliary compartments being additionally defined by a floor extending rearwardly to said transverse panel, a seat including a subdivided seat cushion and a subdivided back rest mounted in the rear portion of said passenger compartment, a fixed package shelf in the rear portion of said passenger compartment and behind said back rest mounted substantially at the upper edge of said back rest for closing-off the space between said back rest and said transverse panel, and for closing-off said rear compartment from said passenger compartment, means for holding said seat in spaced relationship from said upright, transverse panel and said floor, a transverse member beneath said seat cushion substantially at the front edge thereof for closing-off the space between said seat cushion and said floor, thereby providing said closed auxiliary compartment in a form of a continuous space extending from said shelf downwardly behind said back rest and forwardly beneath said seat cushion to said wall, and individual hinging means for swinging each subdivided portion of said back rest and of said cushion into positions providing access to the entire length of the open portion of said compartment.

9. In combination with a motor vehicle body including side-walls, a floor, a parcel tray in the rear of said body connected to said side-walls, a transverse panel extending across the body and joining the bottom portion of said tray to said floor, a seat having a seat cushion and a back rest, two longitudinally adjustable seat-tracks, one of said seat-tracks being mounted on said floor adjacent to the right side-wall of said body, and the other seat-track—adjacent to the left side-wall of said body, a seat-supporting frame formed separately of said body and mounted on said seat-tracks to hold said seat in an adjustable, spaced relationship with respect to said transverse panel and said floor, said frame including front and rear transverse members, the front transverse member being positioned substantially under the front bottom portion of said seat cushion, and said rear transverse member— behind the top rear portion of said back rest, a flexible cover joining the rear, transverse member of said frame to the front edge of said tray, a front transverse wall beneath said seat cushion substantially at the front edge thereof for closing-off the space between said seat cushion and said floor, thereby providing a closed auxiliary compartment formed of a continuous space extending from said shelf downwardly behind said back rest and forwardly beneath said seat cushion to said front transverse wall, the holding capacity of said compartment being adjustable by adjusting the seat on said seat-tracks, and hinging means for swinging said back rest and said seat cushion into positions providing access to the entire length of said compartment.

10. In combination with a motor vehicle body as defined in claim 9 in which said seat extends transversely from one side-wall to the other, and is subdivided into two halves so as to form two independent auxiliary subcompartments, one subcompartment under each half of said seat, and said hinging means includes individual hinging means for each half of said seat, thereby permitting an easy access to the open subcompartment by using the closed half of said seat as a support for the user of the compartment.

11. In combination with a motor vehicle body as defined in claim 9 in which said front transverse wall is secured with its upper edge to said front transverse member of said frame, whereby the length of said compartment may be increased by shifting said seat into its forward position on said seat-tracks.

12. In combination with a motor vehicle body including side walls, a floor, a rear axle and differential kick-up joined to said floor, a parcel tray in the rear of said body connected to said side walls, a panel extending across the body and joining the bottom portion of said parcel tray to said rear axle kick-up, a seat having a seat cushion and a back rest subdivided into two halves, said seat being arranged in the rear end of the body with its back rest mounted in front of said tray and in spaced relationship with respect to said panel and said rear axle kick-up, said cushion and said back rest having their lower rear corners cut off to form two slanting surfaces approximately paralleling the respective opposite curved surfaces of said rear axle kick-up spaced from said surfaces, a transverse member mounted on said floor and supporting the front bottom edge of said cushion and its bottom surface in spaced relationship with respect to said floor to provide a curved compartment extending from said parcel tray to said transverse member, and individual hinging connections between said transverse member and each half of said seat cushion and between each half of said back rest and said parcel tray whereby said subdivided cushion and back rest act as two covers for the front part of said compartment.

13. In combination with a motor vehicle body as defined in claim 12 which further includes edge supports for supporting the bottom side edges of said cushion and the back edges of said back rest, rubber cushioning strips attached to said edge supports, said transverse member, and the front edge of said shelf, and water-proof material covering the bottoms of said subdivided cushion and the backs of said subdivided back rest for rendering said compartment dustproof and moistureproof.

14. In combination with a motor vehicle body as defined in claim 12 in which the bottom surface of said cushion and the floor portion of said compartment form two substantially parallel surfaces.

15. In combination with a motor vehicle body as defined in claim 12 in which the rear surface of said back rest and said panel form two substantially parallel surfaces.

16. In combination with a motor vehicle including a frame, a body mounted on said frame, said body including a floor, floor frame kick-ups for accommodating rear axle frame kick-ups, side panels, rear wheel housings connected to said side panels and said floor frame kick-ups, a differential and rear axle kick-up, and a drive-shaft kick-up, two bottom members each positioned between said drive-shaft kick-up and respective floor frame kick-ups; said members being joined in front to said floor and on their sides to said drive-shaft kick-up and said frame kick-ups respectively by means of substantially vertical walls, and in the rear to said axle and differential kick-up, a transverse member mounted on said floor directly in front of said bottom portions and connected with its rearwardly curved ends to said wheel housings, a rear seat including a subdivided seat cushion and a subdivided back rest, means for supporting each of the subdivided portions of said cushion along their front and side edges in spaced relationship with respect to said bottom members, a shelf in the rear of said back rest and extending rearwardly of said back rest substantially at the level of the upper end of said back rest, a transverse panel, the sides of said panel being joined to said side panels and said wheel housings, its bottom—to said differential and rear axle kick-up, and its top—to said shelf, means for supporting each subdivided portion of said back rest along its top and side edges in spaced relationship with respect to said transverse panel to provide two curved auxiliary compartments extending downwardly from said shelf to said transverse member and laterally to said side panels in their upper portion, and in their lower portions—to said vertical walls respectively, and a hinging arrangement for each subdivided portion of said seat cushion and said back rest whereby said portion acts as a front cover for its compartment.

17. In combination with a motor vehicle as defined in claim 16 in which said bottom members are depressed below the level of the floor in front of said seat.

18. In a vehicle body comprising a floor; sidewalls; an upright transverse panel connected to said floor and to said side-walls, a seat including a seat cushion and a back rest positioned between said side-walls; a transverse, substantially vertical wall beneath said seat cushion, substantially at the front edge thereof, for closing off the space between said seat cushion and said floor; a fixed shelf, behind said back rest, attached to said side-walls and mounted substantially at the upper edge of said back rest for closing off the space between said back rest and said transverse panel, thereby providing a closed auxiliary compartment in the form of a continuous, uninterrupted space extending from said shelf downwardly behind said back rest, and forwardly beneath said seat cushion to said wall; means for holding said back rest and said seat cushion in spaced relationship with respect to said floor and said transverse panel, said means including two, longitudinally adjustable seat-tracks, each mounted adjacently to the respective side-walls of said body, and a seat-supporting frame formed separately of said body and slidingly mounted on said seat-tracks to permit adjustment of said frame with respect to said transverse panel for varying the storage capacity of said auxiliary compartment, a hanger holder fastened to said shelf for suspending full-length garments in an unfolded condition within said compartment; and hinging means between said frame and said seat for swinging said back rest and said seat cushion into positions providing access to the entire length of said compartment, whereby said cushion and back rest, in their normal positions, act as top and side-covers, respectively, for said compartment.

NICHOLAS T. VOLSK.

(References on following page)

REFERENCES CITED

The following references are of record in the file of this patent:

UNITED STATES PATENTS

| Number | Name | Date |
|---|---|---|
| 1,087,003 | Engel | Feb. 10, 1914 |
| 1,473,161 | Rogers | Nov. 6, 1923 |
| 1,679,025 | Fekete et al. | July 31, 1928 |
| 1,806,882 | Richardson | May 26, 1931 |
| 2,068,505 | Morrison | Jan. 19, 1937 |
| 2,140,122 | Westrope et al. | Dec. 13, 1938 |
| 2,198,653 | Breer et al. | Apr. 30, 1940 |

FOREIGN PATENTS

| Number | Country | Date |
|---|---|---|
| 571,433 | France | Feb. 1, 1924 |
| 671,492 | France | Sept. 2, 1929 |
| 774,951 | France | Oct. 1, 1934 |

OTHER REFERENCES

"Location of Baggage Space in Intercity Buses," page 23, of August 1925 "Motor Vehicle Monthly."